United States Patent Office 3,465,768
Patented Sept. 9, 1969

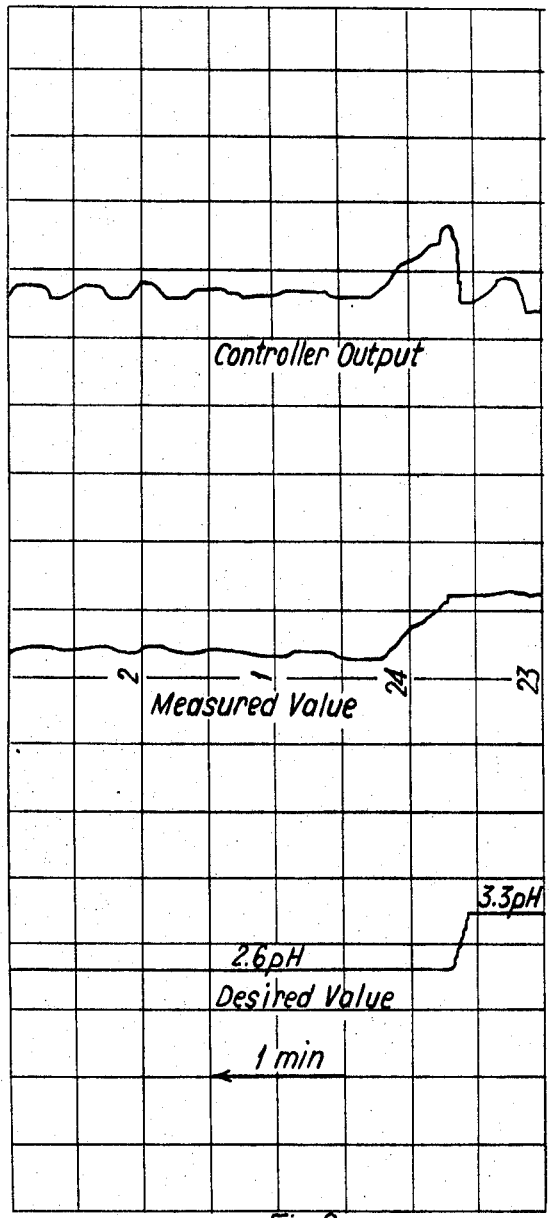

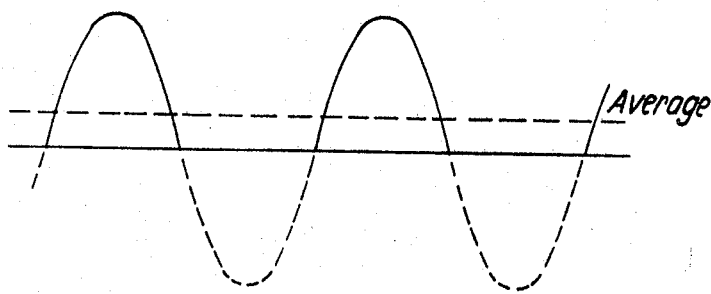
(a) *Half-Wave Rectification*
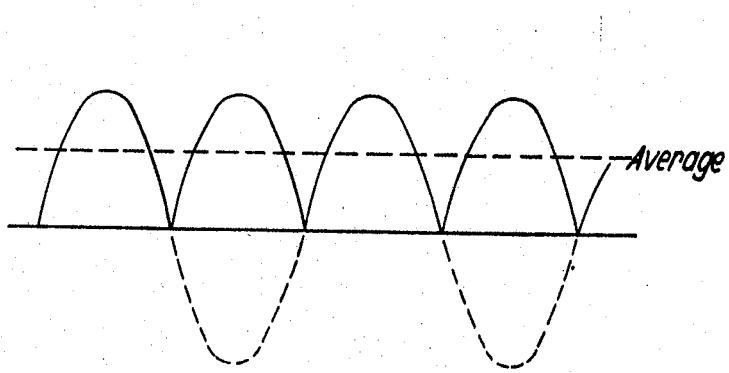
(b) *Full-Wave Rectification*
*Fig. 4.*

3,465,768
GAIN-ADAPTIVE CONTROL SYSTEM
Ernest Norman Martin, Norton-on-Tees, England, assignor to Imperial Chemical Industries Limited, London, England, a corporation of Great Britain
Filed Aug. 11, 1967, Ser. No. 660,061
Claims priority, application Great Britain, Aug. 16, 1966, 36,634/66
Int. Cl. F17d 3/00; F15b 5/00; G05d 16/00
U.S. Cl. 137—14                    15 Claims

ABSTRACT OF THE DISCLOSURE

A closed process control loop is caused to generate its own test signal which is continuously sensed by a gain-adaptive control which uses any durations therein to adjust the controller gain.

Figure 1:
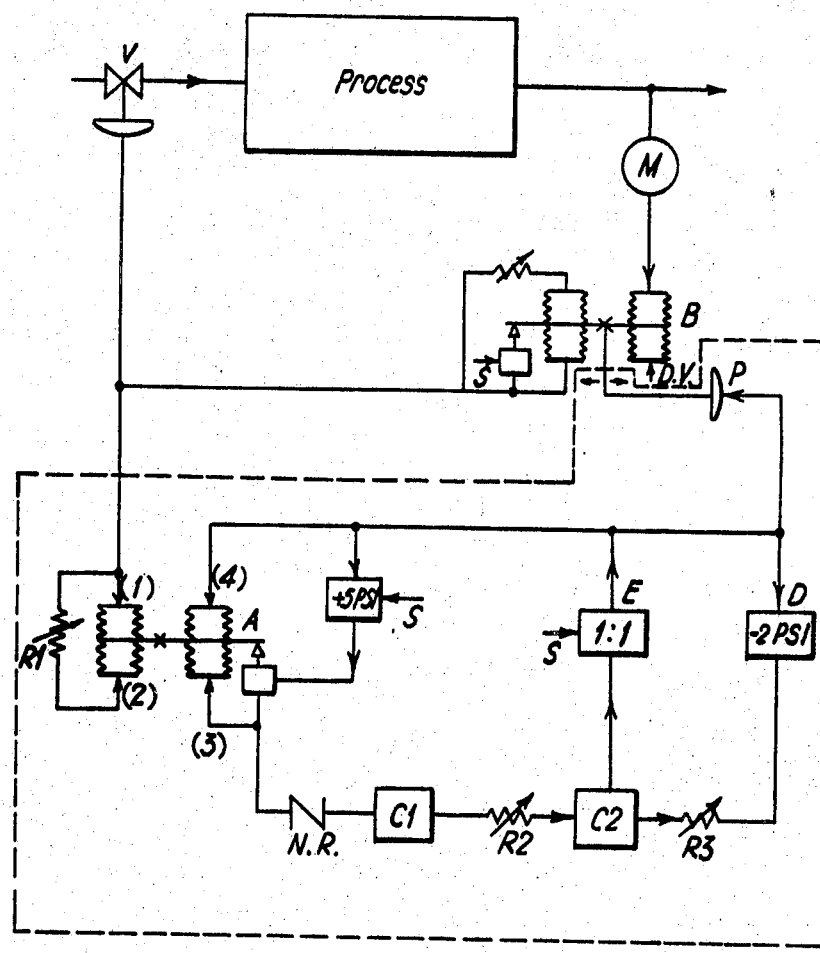

The present invention relates to a closed process control loop of the kind in which deviation of an actual measurement of the process from a prescribed value for said measurement is detected and utilised by a controller to generate an output which is a function of said deviation, and said output is utilised to regulate an input to the process (for example, a control valve) whereby to restore said actual measurement to its said prescribed value.

In practice, most closed process control loops contain non-linearities arising from the characteristics of the process itself, of the control of the input to the process (such as a control valve), and of the measurement of the process, so that the gain of the control loop varies with the working conditions. The use of a fixed-gain controller which is adjusted to give an adequate margin of stability at the least favourable part of its working range is therefore a compromise resulting in consequent sacrifice in dynamic response elsewhere. In the majority of installations, the non-linearities are mild and this loss in performance is not serious, but there are cases, of which pH is an extreme example, where this is not true. If the form of the non-linearity is known and constant, an obvious solution is to incorporate in the loop a unit having a compensating non-linearity designed to equalise the gain over the working range. Thus, the measurement signal may be passed through a "lineariser," a conventional compensator which produces an output of uniform sensitivity from an inherently non-linear measurement, or the control valve characteristics may be modified to achieve a similar result.

The effectiveness of such arrangements, however, depends on the accuracy with which the correspondence between the two non-linearities can be maintained. Any drift in either of the non-linearities, or the alignment between them, will cause a variation in effective gain which is less severe than in the uncompensated system but which is nevertheless embarrassingly large in extreme cases.

The object of the present invention is to provide a method of and a gain adaptive control for controlling a closed process control loop of the kind described and which overcomes the above-mentioned disadvantages. The invention is particularly, but not exclusively, applicable to pH control.

Many closed process control loops of the kind described normally operate with a small amplitude of oscillation (or hunt) and, provided the amplitude is maintained at a low level, this has no deleterious effect on the process. Indeed, it is often regarded favourably by the plant operators as a sign that the system is "live." In these circumstances, maximum sensitivity would be obtained with the controller adjusted for critical gain, at which the process is on the verge of undamped oscillations, but such a setting should not be used in practice because, at this point, the margin of safety vanishes. If, however, any tendency to undamped oscillation could be checked immediately it became apparent, this objection would no longer be valid.

The present invention accordingly provides a method of controlling a closed process control loop of the kind described, which comprises the steps of adjusting the amplitude of the natural oscillations of the control loop so that said control loop generates its own detectable test signal, continuously sensing said test signal and detecting any deviation in its amplitude from a prescribed value due to an alteration in the process response, and using any such deviation in amplitude to adjust the controller gain until said prescribed value has been restored.

The invention further provides a gain-adaptive control for a closed process control loop of the kind described, comprising means for adjusting the amplitude of the natural oscillaitons of the control loop so that said control loop generates its own detectable test signal, means for continuously sensing said test signal and for detecting any deviation in its amplitude from a prescribed value due to an alteration in the process response, and means responsive to any such deviation in amplitude for adjusting the controller gain until said prescribed value has been restored.

In one embodiment, the invention provides a gain-adaptive control for a closed process control loop of the kind described, comprising means for adjusting the amplitude of the natural oscillations of the control loop so that said control loop generates its own detectable test signal, a differential relay adapted to respond to changes in the controller output whilst remaining insensitive to the mean steady-state level of the control loop, capacity means adapted to be charged by said differential relay, responsive to said changes in the controller output, so that the charge of said capacity means is a measure of said changes, and an actuator adapted, responsive to said charge, to adjust the controller gain until said mean steady-state level of the control loop has been restored.

One embodiment of the invention is illustrated in FIG. 1 of the accompanying drawings which shows a typical closed process control loop of the kind described in association with a gain-adaptive control according to the present invention. For convenience, the gain-adaptive control according to the present invention has been enclosed by dotted lines, and the portion outside the dotted lines represents a typical closed process control loop of the kind described. The control loop may, for example, be used to control the pH of a process, the input to which is through a control valve V, and the pH of which is constantly measured at M. The loop controller, generally designated B, compares the actual value of the measurement M with a desired value therefor DV, and responsive to any deviation in these two values generates an output which is a function of such deviation and which is used to adjust the input control valve V in order to restore the actual measurement M to its desired value. The controller B may function as a relay and, as indicated above, it is customary to employ a fixed gain therefor which is adjusted to give an adequate margin of stability at the least favourable part of its working range. The loop may function, for example, electrically, pneumatically, hydraulically or mechanically, subject only to the proviso that, at some stage, the controller output must be, or must be translated into, a force suitable for actuating the control valve. In the embodiment illustrated, the controller B comprises orthodox pneumatic units controlling the supply of compressed air S (e.g. at 20 p.s.i.) to the loop.

In the embodiment of the invention illustrated in FIG. 1, the gain-adaptive control is supplied from the same source of compressed air S. The gain of the controller B is adjusted until the control loop oscillates at a small amplitude at its natural frequency, and the output of the controller B, in addition to being applied to the control valve V, is also applied directly to the input 1 of a differential relay A, and to the corresponding opposed input 2 through an adjustable restrictor R1 (which is an impedance to airflow, for example a needle valve, capillary tubing or the like). This arrangement hereinafter referred to as the "'oscillation detector," constitutes an elementary form of high pass filter, allowing relay A to respond to single isolated transients, persistent oscillations and continuous random disturbances in the controller output whilst making it completely insensitive to the mean steady-state level of the control loop and its test signal. The oscillation-detector is, however, single-sided and therefore responds to deviations from the mean steady-state level in one direction only; in electrical terms it behaves as a half-wave rectifier (see FIG. 4a). At the steady-state level, there is no output from the relay A, but in the presence of oscillations the restrictor R1 causes a time lag which allows a corresponding oscillatory relay output, in the form of air pulses, to be developed. These air pulses are used by the relay output 3 to charge a small capacity C1 through a non-return valve NR so that the resultant pressure in C1 is a measure of the amplitude of oscillation which respect to the mean level applied to the opposing input 4. A second capacity C2 receives a charging air flow from C1 through a restrictor R2 but is simultaneously discharged through a restrictor R3, and the rate of discharge is made constant by imposing a fixed pressure drop (e.g. about 2 p.s.i.) across R3 by means of a constant differential relay D.

The pressure in C2 therefore reaches an equilibrium when the charging flow through R2 is equal to the discharge through R3, and is attained for an output amplitude from the controller B which is dependent on the gain setting of relay A and the settings of restrictors R1, R2 and R3. R2 and R3, together with capacity C2, form a time constant which must be long enough to give substantial smoothing at the natural frequency of the control loop. This implies that the resistance of R2 and R3 will usually be fairly high so that the pressure in C2 cannot be used directly to supply an external load. A 1:1 relay E (volume booster) is therefore interposed in order to boost the pressure in C2 sufficiently for this purpose.

The primary function of this pressure in C2 is to vary the controller gain by actuating and positioning an actuator P. A secondary function is, however, to provide a reference level for both the charging and discharging rates of capacity C2, so that the response to changes is independent of the actual working level. At the same time, it also provides a reference level for the pressure of the supply of compressed air to relay A. As mentioned earlier, relay A is sensitive to single isolated transients in addition to persistent oscillations and continuous random disturbances. The pressure of the supply of compressed air to relay A is therefore limited (for example to 5 p.s.i. greater than the mean output pressure) to avoid such disturbances having an unduly large effect on the gain.

The gain adaptive control of the invention was first tested on a simple two-capacity pressure control system with a natural period of about 10 secs. This was not a very rigorous test but it served to show that stable operation was possible with a measured variable amplitude less than ±1% of the measuring span. Under these conditions, consistent gain adjustment in the range 5–10 followed variations of supply pressure, which altered the stability margin of the loop. During the course of these experiments, the main air supply pressures was subject to periods of severe random fluctuation and it was observed that these were also met by reductions in gain so that the effects were attenuated.

Figure 3:
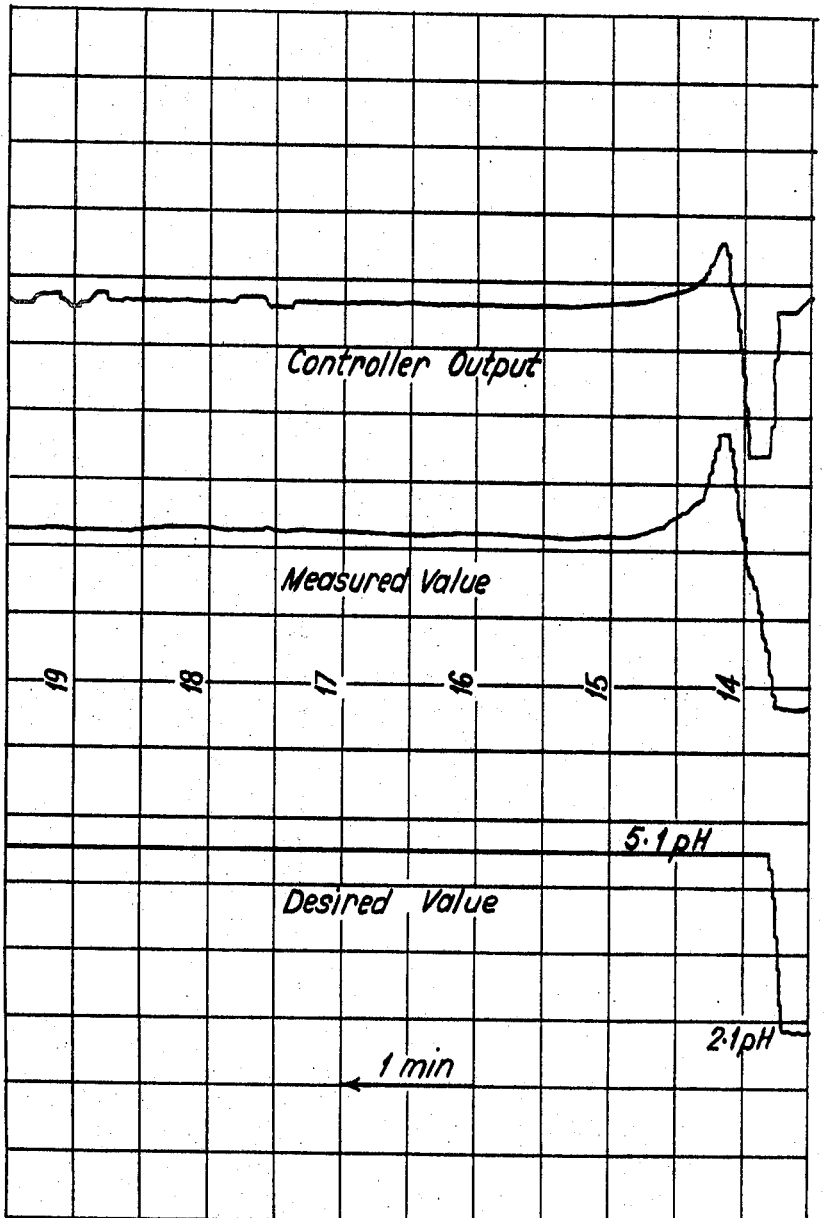

A second set of tests was carried out on a laboratory scale pH control system, in which a flow of ammonia liquor was neutralised with dilute sulphuric acid in a stirred vessel, the pH being measured near the vessel exit. This system had already shown that dynamic stability was very sensitive to the circulation pattern of the stirrer and to the relative positions of the injection and measuring points within it. It was also confirmed that the effectiveness of a lineariser was susceptible to slight drifts in the measuring circuits of electrodes and to changes in reagent strength, so that gain changes of 10:1 could still occur even under laboratory conditions. The natural period of this system was of the order of 35 secs. and the adaptive gain-control of the invention was able to adjust the gain to give a constant amplitude of valve movement irrespective of pH setting and whether a lineariser was used or not. With the lineariser out of circuit, giving simple pH control, almost the whole range of controller gain adjustment (less than ⅕ to 20) was used in covering the full range of desired value settings. Because, in this arrangement, the controller output amplitude was maintained constant, the measurement amplitude reflected the non-linearity of the system and increased rapidly as the controller gain was reduced below unity. With the lineariser in circuit and accurately aligned, the gain varied only by a factor of 2 between about 1.5 and 3, but a misalignment of 0.2 pH increased this to a factor of 8 between about 1.25 and 10. FIGS. 2 and 3 of the accompanying drawings show typical responses to sudden changes in desired value of the controller.

These practical tests show that even a simple gain-adaptive control, such as that described, is capable of giving a very satisfactory performance without involving either inordinate cost or difficulty in maintenance. A noticeable feature of the behaviour is that, because of its sensitivity to sudden step changes, these always result in a reduction of gain and a heavily damped initial response. Only under steady conditions is the gain increased to the critical value, but in the face of continued random disturbances the gain is automatically adjusted to attenuate these so that the output reaches the desired mean amplitude. Another point of practical importance is the relative ease of setting up a multi-term controller if one of the terms is adjusted automatically. Fortunately variations in gain have little effect of the natural frequency of a system, so that once appropriate settings of the derivative and integral terms have been found, further adjustment is unnecessary.

As described hereinabove, the oscillation-detector is single-sided and responds only to deviations from the mean in one direction. In electrical terms, it behaves (as stated above) as a half-wave rectifier (see FIG. 4a). Full-wave rectifier action (see FIG. 4b), because of its smoother output and higher efficiency would enable the gain-adaptive control to work with a smaller amplitude of oscillation in the control loop and would also require a smaller time constant in the oscillation-detector output, i.e. it could be faster in response.

Full-wave rectifier action could be obtained by including a second oscillation-detector, similar to but operating in the opposite sense from, the first oscillation-detector, and causing the outputs of both oscillation detectors to charge the capacity C2.

The measured variable M is a better indicator of oscillatory conditions than the controller output when the controller gain is less than unity. It can therefore be used equally well in these circumstances and, where the gain might be expected to vary over a wide range, oscillation-detectors operating from both the measured variable M and the controller output can be incorporated in the gain-adaptive control, their outputs being arranged to charge the capacity C2 in parallel so that whichever gives the greater output decides the appropriate gain for the controller.

The invention may be operated by electrical, mechanical, pneumatic or hydraulic means, or any combination thereof, but from a practical point of view, orthodox pneumatic units, because of their ready availability, form a convenient basis for constructing a simple gain-adaptive control according to the invention. However, the functions of signal filtering, rectification and smoothing can conveniently be carried out electrically with considerable saving in space and the almost complete elimination of mechanically moving parts. Special care, however, may be required to obtain smoothing time constants long enough for process applications. If, one the other hand, pneumatic or hydraulic operation is preferred, fluid amplifier techniques (or "fluidics" as they are now known) can equally well provide the same functions with the added advantage of a complete safety in potentially hazardous atmospheres.

I claim:

1. A method of controlling a closed process control loop of the kind in which deviation of an actual measurement of the process from a prescribed value for said measurement is detected and utilised by a controller to generate an output which is a function of said deviation, and said output is utilised to regulate an input to the process whereby to restore said actual measurement to its said prescribed value, which method comprises the steps of adjusting the amplitude of the natural oscillations of the control loop so that said control loop generates its own detectable test signal, continuously sensing said test signal and detecting any deviation in its amplitude from a prescribed value due to an alteration in the process response, and using any such deviation in amplitude to adjust the controller gain until said prescribed value has been restored.

2. A method as claimed in claim 1, including the steps of continuously sensing said test signal, neutralising the mean steady-state level thereof, rectifying oscillations of said test signal to produce a deviation signal which is a function only of said oscillations, and causing and deviation signal to adjust the controller gain until said prescribed value has been restored.

3. A method as claimed in claim 2, including the step of converting said deviation signal into a force adapted to actuate and adjust the controller gain.

4. A method as claimed in claim 2, including the step of smoothing said deviation signal to attenuate the effects of isolated transient increases in the controller output.

5. A closed process control loop which comprises means for detecting the deviation of an actual measurement of a process from a prescribed value for said measurement, a variable gain controller responsive to said deviation to generate an output which is a function of said deviation, and means responsive to said output to regulate an input to the process whereby to restore said actual measurement to its prescribed value, said gain-adaptive control comprising means for adjusting the amplitude of the natural oscillations of the control loop so that said control loop generates its own detectable test signal, means for continuously sensing said test signal and for detecting any deviation in its amplitude from a prescribed value due to an alteration in the process response, and means responsive to any such deviation in amplitude for adjusting the controller gain until said prescribed value has been restored.

6. A gain-adaptive control as claimed in claim 5, wherein said means for continuously sensing said test signal and for detecting any deviation in its amplitude from said prescribed value comprises a differential oscillation-detector adapted to neutralise the mean steady-state level of the test signal and to rectify oscillations of said test signal, whereby to produce a deviation signal which is a function only of said oscillations, said differential oscillation-detector being further adapted to feed said deviation signal to said means for adjusting the controller gain.

7. A gain-adaptive control as claimed in claim 6, wherein said means for adjusting the controller gain comprises capacity means adapted to be charged by said oscillation-detector, so that the charge of said capacity means constitutes a deviation signal which is a function only of said oscillations, and an actuator adapted to be actuated by said charge to adjust the controller gain.

8. A gain-adaptive control as claimed in claim 7, including means for converting the charge of said capacity means into a force adapted to actuate said actuator.

9. A closed process control loop which comprises means for detecting the deviation of an actual measurement of a process from a prescribed value for said measurement, a variable gain controller responsive to said deviation to generate an output which is a function of said deviation, and means responsive to said output to regulate an input to the process whereby to restore said actual measurement to its prescribed value, said gain-adaptive control comprising means for adjusting the amplitude of the natural oscillations of the control loop so that said control loop generates its own detectable test signal, a differential relay adapted to respond to changes in the controller output whilst remaining insensitive to the mean steady-state level of the control loop, capacity means adapted to be charged by said differential relay, responsive to said changes in the controller output, so that the charge of said capacity means is a measure of said changes, and an actuator adapted, responsive to said charge, to adjust the controller gain until said mean steady-state level of the control loop has been restored.

10. A gain-adaptive control as claimed in claim 9, including means for feeding said test signal directly to one input of the differential relay, and through a restrictor to a corresponding opposed input of the differential relay, so that in the steady-state there is no output from the relay but in the presence of oscillations the time-lag caused by the restrictor allows a corresponding oscillatory relay output to be developed, said oscillatory relay output constituting a measure of the process response.

11. A gain-adaptive control as claimed in claim 10, including non-return means through which said oscillatory relay output is fed to said capacity means.

12. A gain-adaptive control as claimed in claim 11, wherein said capacity means comprises a first capacity adapted to be charged by said oscillatory relay output through said non-return means, and a second capacity adapted to be charged by said first capacity through a second restrictor and to be simultaneously discharged at a substantially constant rate through a third restrictor, so that said second capacity is at equilibrium when the charging flow through said second restrictor is equal to the discharging flow through said third restrictor, and any charge built up in said second capacity constitutes a deviation signal which is a function of the process response.

13. A gain-adaptive control as claimed in claim 12, wherein said second and third restrictors and said second capacity are selected to provide substantial smoothing at the natural frequency of the control loop.

14. A gain-adaptive control as claimed in claim 12, including means for causing said charge built up in said second capacity to actuate said actuator for adjusting the controller gain.

15. A gain-adaptive control as claimed in claim 14, including means for boosting said charge to provide sufficient power to actuate said actuator.

References Cited

UNITED STATES PATENTS 2,985,183   5/1961   Peatross _____ 137—86

ALAN COHAN, Primary Examiner

U.S. Cl. X.R.

137—86